UNITED STATES PATENT OFFICE.

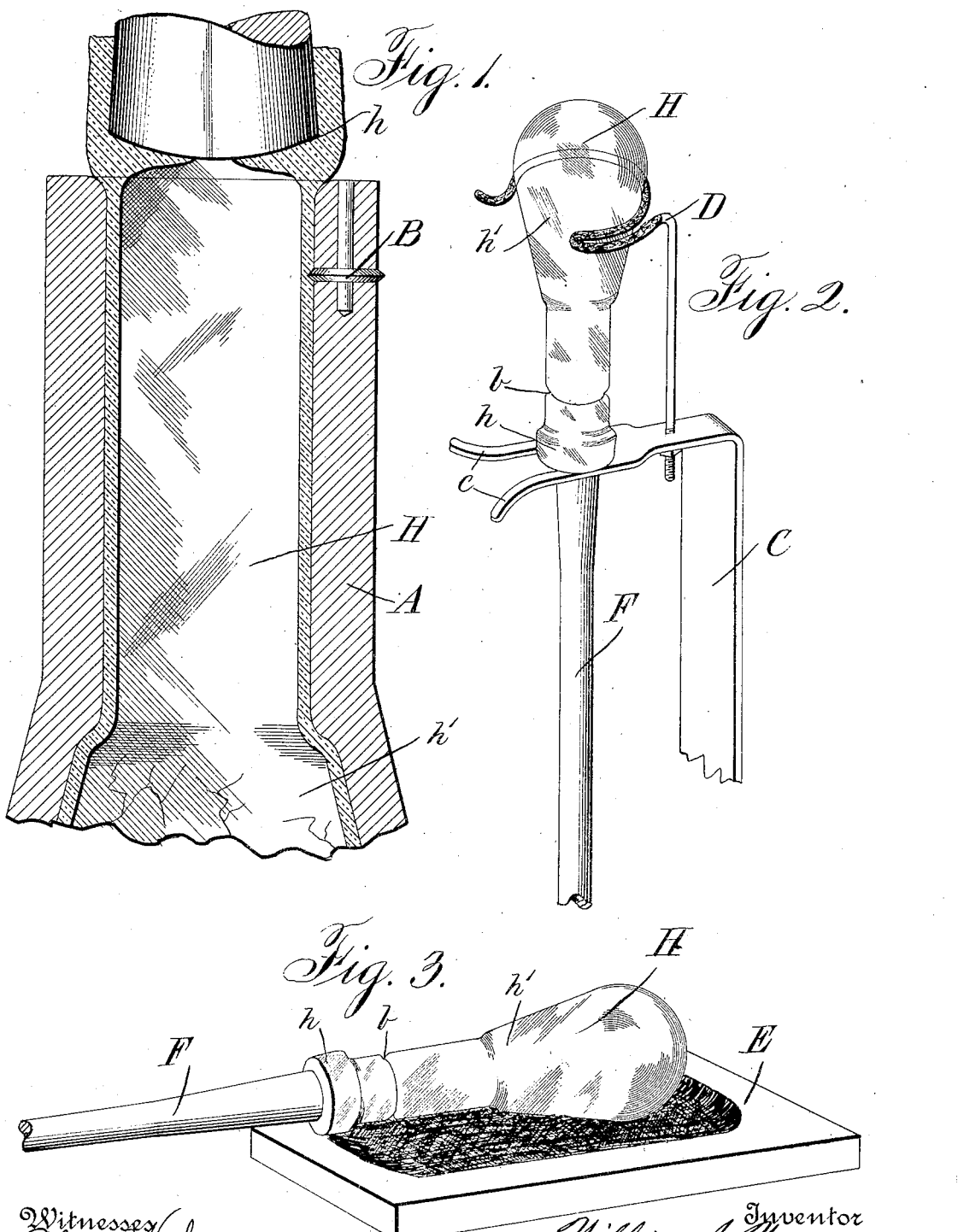

WILLIAM JAMES WOODS, OF CORNING, NEW YORK, ASSIGNOR TO CORNING GLASS WORKS, OF CORNING, NEW YORK, A CORPORATION OF NEW YORK.

PROCESS OF MANUFACTURING BLOWN-GLASS ARTICLES.

1,100,811.	Specification of Letters Patent.	Patented June 23, 1914.

Application filed July 22, 1912. Serial No. 711,002.

*To all whom it may concern:*

Be it known that I, WILLIAM JAMES WOODS, a citizen of the United States of America, and a resident of Corning, county of Steuben, and State of New York, have invented certain new and useful Improvements in Processes of Manufacturing Blown-Glass Articles, of which the following is a specification.

Many articles of glass, especially of the thinner grades, such as electric lamp bulbs are at the present time blown on the end of a hollow tube or pipe. This is generally done by dipping the end of the pipe into molten glass by which a "gather" is caused to adhere to the end of the pipe, which gather is subsequently formed into a blank and blown up in a mold to the desired shape, although it has been proposed to affix a preformed blank to the blow-pipe either by adhesion or mechanically. Whatever of the above process be employed, the finished article or "blow" is blown from a part of the blank only, the remainder of the blank forming what is technically called the "moil." This moil is now generally severed from the part that is to form the finished article by touching the hot glass by a cold knife. The mass of moil, especially when the blank is formed on the blow-pipe by the process of dipping the pipe into the molten glass and the article blown has a thin wall, contains considerable heat, whereas the thin walls are rapidly cooled by radiation from their extended surfaces and by contact with the walls of the mold. This rapid cooling of the walls results in a strained condition of the glass of which they are composed.

My present invention has for its object to utilize the heat of the moil for annealing the walls of the finished article by maintaining such walls and the moil adjacent to each other, and in such relative position that air, heated by the moil, will pass around and envelop the blown walls, annealing the same.

Referring to the accompanying drawings in which corresponding parts are designated by corresponding marks of reference:—Figure 1 is a schematic view of a mold adapted to be used in carrying out the improved process herein described, a bulb being represented as being blown within the mold. Fig. 2 is a perspective view of the blow-pipe holder adapted to be used in carrying out the herein described process, a blow-pipe with a "blow" thereon being shown in the latter in its annealing position. Fig. 3 illustrates the manner in which the blow is separated from the moil.

Referring to the mold A shown in Fig. 1, the same may be of any usual construction save that it has projecting into the interior of the neck thereof a part B, adapted to form a groove in the walls of the blown article during the rotation of the latter relative to the mold and while the walls are still plastic. This part B is shown in the form of a wheel having a beveled edge, but this is not essential to my invention as it may have a different form and need not in practice be mounted on the mold, it being only essential that such part B project slightly within the mold cavity and be moved relative to the gather. It will be noted that as the gather expands and is rotated, the part B will cause a formation of a channel or small groove $b$ in the wall of the gather which will thus be weakened at that point.

Referring to Fig. 2, C is a suitable frame, having a bifurcated horizontal end $c$ within which the blow-pipe may be inserted, and being provided with an upward extension D in the form of a bent wire, covered with asbestos or some similar non-conducting material, this guard being so shaped that when the blow-pipe is inserted within the bifurcated end $c$, the "blow" will be partly inclosed and supported by the guard.

In Fig. 3 I have shown the manner in which the "blow" is severed from the moil at the grooved portions of the wall. The apparatus for accomplishing this may comprise a suitable cushioned pad E as shown.

In the drawings I have shown how my process may be carried out with a blow-pipe upon which glass has been gathered by dipping, but it will be understood that it is applicable irrespective of how the glass may be carried on the pipe. In these drawings the pipe F and glass H are shown as they appear after the glass has been blown, the glass comprising the moil $h$ and the blown wall or blow $h'$.

In carrying out my full process herein described, a gather of glass upon the blow-pipe is inserted in the mold A and blown in the usual manner by paste mold work, that is to say with relative rotation between the mold and gather. In so doing the groove $b$ will be formed in the wall of the blown article. The blow-pipe with the "blow" thereon is then inserted in the bifurcated end of the standard C, the moil resting on the standard and supporting the blow-pipe, while the gather is located within the extension D. In this position, which is shown in Fig. 2, the heat from the moil (which is still at a high temperature) is imparted to the surrounding air, which rises up and around the thin blown walls, which it envelops annealing the same. The pipe is left in this position until the moil has sufficiently annealed the "blow." After the article has been sufficiently annealed as above described the blow may be separated from the moil by striking the form against the suitable pad as at E.

It will be noted that by my improved process considered as an entirety the blown wall is first weakened during formation at the point where it is to be severed; and then annealed by the heat arising from the moil and is then cracked off. In this latter operation the previous weakening of the wall and its annealing is of great value in reducing the liability of the blow to shattering and results in a substantial reduction of the losses which occur in such cracking off.

Having thus described my invention what I claim and desire to secure by Letters Patent is:—

1. The hereinbefore described process of annealing the walls of articles blown from a blank and to which a moil is attached, which consists in so positioning the blown walls that an air current heated by the moil passes in proximity thereto to effect the annealing, substantially as described.

2. The hereinbefore described process of treating glass articles blown from a blank and to which a moil is attached, which consists in annealing the cooled walls of the article immediately after the blowing by an air current heated by the moil attached thereto, and in then cracking off the "blow" from the moil.

3. The hereinbefore described process which consists in forming a blown glass article with a weakened portion, annealing such blown article by the heat from the moil and in separating the "blow" from the moil at the weakened portion after the annealing.

In testimony whereof I have signed my name in the presence of two witnesses.

WILLIAM JAMES WOODS.

Witnesses:
  JOHN L. THOMAS,
  G. WILLIS DRAKE.